United States Patent [19]

Boeshart

[11] Patent Number: 5,658,483
[45] Date of Patent: Aug. 19, 1997

[54] CORNER JOINT TIE

[76] Inventor: Patrick E. Boeshart, P. O. Box 774, Sioux City, Iowa 51102

[21] Appl. No.: 528,140

[22] Filed: Sep. 14, 1995

[51] Int. Cl.$^6$ .................................................... E04G 17/02
[52] U.S. Cl. .......................... 249/191; 52/285.1; 52/426; 249/47; 249/194; 249/216; 403/231; 403/402
[58] Field of Search ........................ 249/38, 40, 191, 249/194, 213, 47, 216, 218; 52/285.1, 699, 700, 426, 427; 403/401, 402, 231; 206/223, 577

[56] References Cited

U.S. PATENT DOCUMENTS

| | | | |
|---|---|---|---|
| 836,245 | 11/1906 | Crawford | 52/66 |
| 963,776 | 7/1910 | Kosack | 249/218 |
| 2,029,082 | 1/1936 | Odam | 52/275 |
| 2,763,048 | 9/1956 | Sullivan | 249/194 |
| 2,776,464 | 1/1957 | Stewart | 249/194 |
| 3,362,739 | 1/1968 | Staeger et al. | 52/285.1 |
| 3,662,985 | 5/1972 | Parker | 249/219.1 |
| 3,989,397 | 11/1976 | Baker | 403/231 |
| 4,154,362 | 5/1979 | McKenney | 220/334 |
| 4,320,888 | 3/1982 | Oury | 249/45 |
| 4,563,381 | 1/1986 | Woodland | 428/156 |
| 4,604,843 | 8/1986 | Ott et al. | 52/426 |
| 4,698,946 | 10/1987 | Wendt | 52/275 |
| 4,784,509 | 11/1988 | Gozzano | 403/24 |
| 4,860,515 | 8/1989 | Browning, Jr. | 52/426 |
| 4,888,931 | 12/1989 | Meilleur | 52/426 |
| 4,889,310 | 12/1989 | Boeshart | 52/426 |
| 4,916,879 | 4/1990 | Boeshart | 52/426 |
| 5,039,058 | 8/1991 | Boeshart | 249/194 |
| 5,520,477 | 5/1996 | Fink | 403/231 |

FOREIGN PATENT DOCUMENTS

| | | | |
|---|---|---|---|
| 2439807 | 3/1976 | Germany. | |
| 400820 | 4/1966 | Switzerland. | |
| 2064617 | 6/1981 | United Kingdom | 52/285.1 |

Primary Examiner—Jay H. Woo
Assistant Examiner—Joseph Leyson
Attorney, Agent, or Firm—Zarley, McKee, Thomte Voorhees & Sease; Mark D. Frederiksen

[57] ABSTRACT

A corner joint tie includes first and second forward plates connected along a common vertical edge and oriented at an angle of less than 180° with respect to one another. A pair of first and second rearward plates are connected together at the same angle as the forward plates, and spaced rearwardly from the respective first and second forward plates by first and second straps. A rib is affixed along the length of each rearward plate to strengthen the rearward plates against flexion along their lengths. The inner and outer plates, associated straps, and associated ribs form an inner tie portion for retaining a pair of form panels at a corner. An outer tie portion is connected to the inner tie portion so as to retain a second pair of form panels parallel to the first pair of form panels at a corner. The outer tie portion includes first and second plates connected at the same angle as the inner tie portion plates, a pair of straps extending from the plates to the ribs on the inner tie portion, and first and second paddles mounted rearwardly and parallel to the plates of the outer tie portion so as to retain a form panel between the panels and respective outer tie portion plates.

15 Claims, 2 Drawing Sheets

CORNER JOINT TIE

TECHNICAL FIELD

The present invention relates generally to ties for concrete wall systems, and more particularly to a special tie utilized to secure the ends of form panels at a corner joint so as to form a corner or "T" intersection in a completed poured concrete wall.

BACKGROUND OF THE INVENTION

While wall forming systems have been in use for many years, a recent development in this industry is in the use of expanded polystyrene panels as forms for poured concrete walls. After the concrete has hardened, the panels may be left in place on the walls to serve as permanent insulation, or they may be stripped off to reveal the exposed concrete.

Upon introduction of this new wall forming system, it was found that it was unnecessary to use small "building blocks" to create the form panels to build a form system for receiving poured concrete. Rather, larger and larger panels are now being utilized to create the concrete forms. As the panels grew in size, the applicant herein devised a new type of tie, described in U.S. Pat. No. 4,765,109, which had special ends that could be "knocked off" to easily remove the large panels from the walls. While the patented tie has proved successful for its intended purpose, it was always necessary to utilize a special additional framing system to hold the form panels at the inner section of two walls, or at a corner where two walls meet.

Right angle corners and "T" intersections were provided with a special corner tie devised by the applicant herein, and described in U.S. Pat. No. 4,916,879. While the corner tie of the '879 patent serves well for its intended purpose, the applicant has found a simpler, more economic, and more flexible method for connecting the ends of a pair of form panels at a corner joint, whether the joint be at a right angle corner or a "T" intersection.

SUMMARY OF THE INVENTION

It is therefore a general object of the present invention to provide a special corner joint tie for use with polystyrene panel-type forms on poured concrete walls.

Another object is to provide a concrete wall form tie which will rigidly hold the form panels necessary to pour a corner in a poured concrete wall.

A further object of the present invention is to provide a concrete wall form tie which will rigidly hold a series of form panels utilized in forming the intersection of two poured concrete walls.

These and other objects of the present invention will be apparent to those skilled in the art.

The corner joint tie of the present invention includes first and second forward plates connected along a common vertical edge and oriented at an angle of less than 180° with respect to one another. A pair of first and second rearward plates are connected together at the same angle as the forward plates, and spaced rearwardly from the respective first and second forward plates by first and second straps. A rib is affixed along the length of each rearward plate to strengthen the rearward plates against flexion along their lengths. The inner and outer plates, associated straps, and associated ribs form an inner tie portion for retaining a pair of form panels at a corner. An outer tie portion is connected to the inner tie portion so as to retain a second pair of form panels parallel to the first pair of form panels at a corner. The outer tie portion includes first and second plates connected at the same angle as the inner tie portion plates, a pair of straps extending from the plates to the ribs on the inner tie portion, and first and second paddles mounted rearwardly and parallel to the plates of the outer tie portion so as to retain a form panel between the panels and respective outer tie portion plates.

DESCRIPTION OF THE PREFERRED EMBODIMENT

Figure 1:
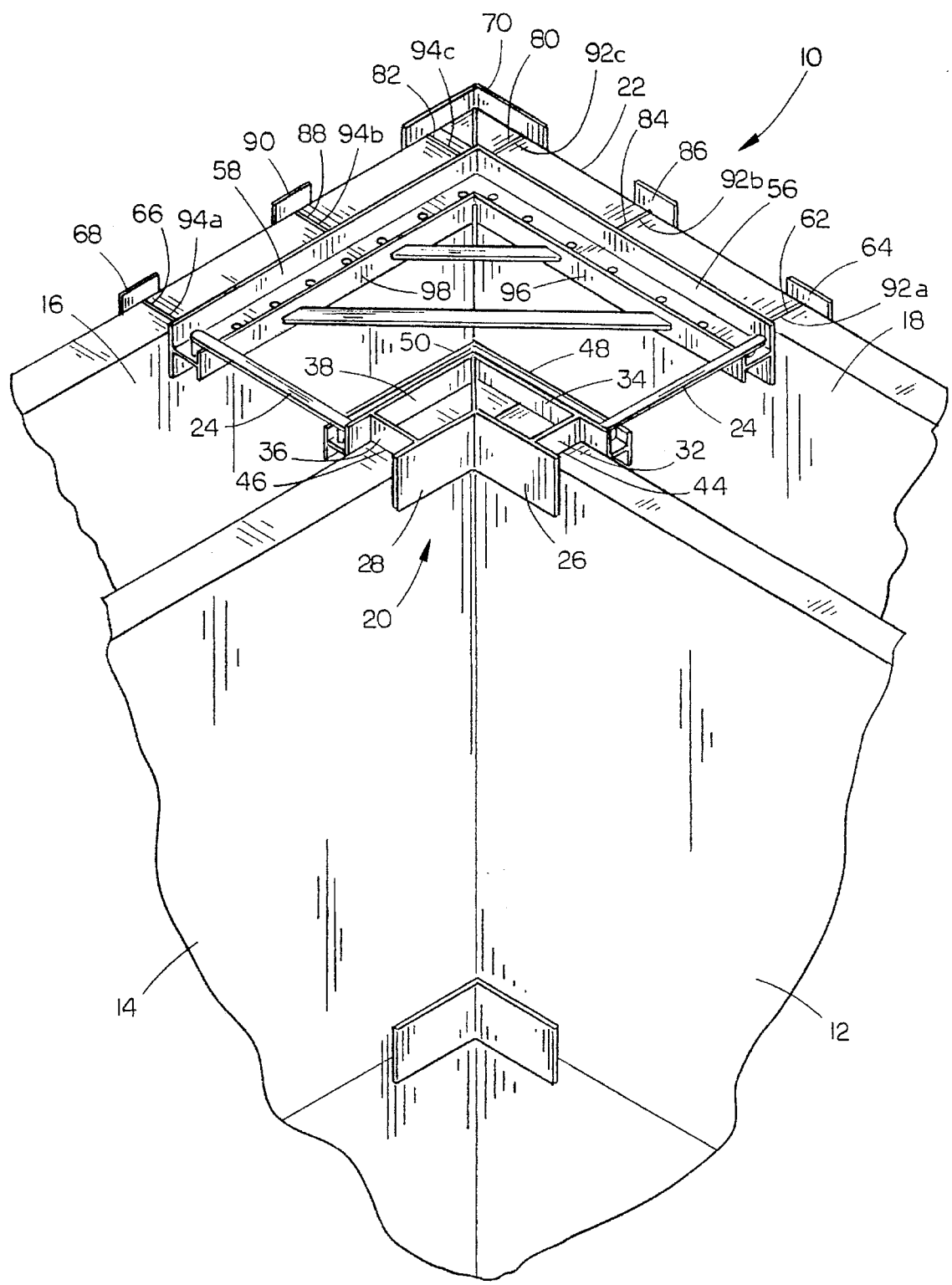
FIG. 1 is a perspective view of the corner joint tie of the present invention installed on a right angle corner formed from concrete form panels.

Referring now to the drawings, in which similar or corresponding parts are identified with the same reference numeral throughout the drawings, and more particularly to FIG. 1, the corner joint tie of the present invention is designated generally at 10 and is shown securing the ends of a plurality of form panels 12, 14, 16 and 18, arranged as a forming system to create a generally right angle corner in a poured concrete wall. As shown in FIG. 1, form panels 12 and 18 are parallel with one another, to form a first wall, and panels 14 and 16 are parallel with one another to form a second wall at an angle to the first pair of panels 12 and 18.

Corner joint tie 10 generally includes an inner tie 20 connecting the "inner" panels 12 and 14, and an outer tie 22 connecting the ends of "outer" panels 16 and 18. A pair of connector rods 24 interconnect the inner and outer ties 20 and 22 to maintain them in a predetermined spaced apart relationship. It is important to note that inner tie 20 and outer tie 22 may be utilized independently of one another to connect and maintain a pair of panels 12 and 14 or 16 and 18 at a corner joint.

Figure 3:
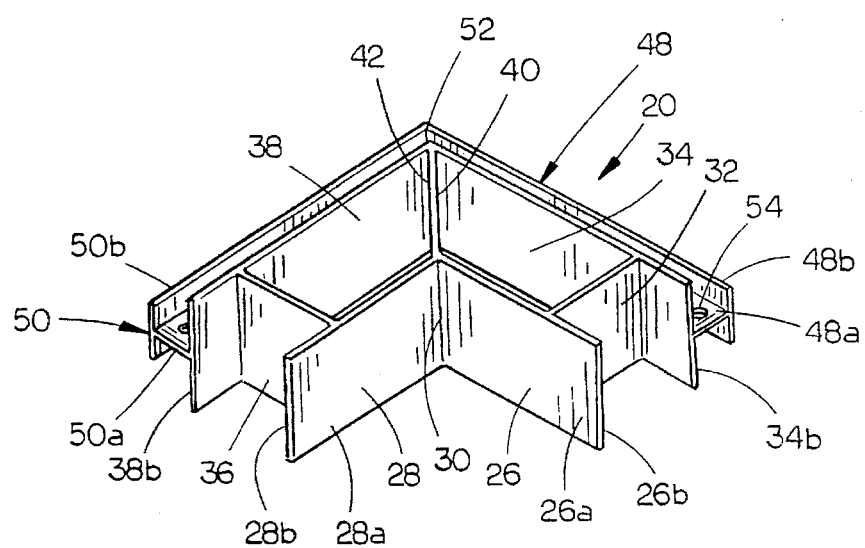
FIG. 3 is an enlarged perspective view of an inner joint tie.

Referring now to FIG. 3, inner tie 20 includes a pair of elongated plates 26 and 28 connected along a common vertical edge 30 at an angle relative to one another. Plates 26 and 28 include forward surfaces 26a and 28a respectively, and rearward surfaces 26b and 28b respectively.

A first strap 32 projects perpendicularly from the rearward surface 26b of forward plate 26, and has a rearward plate 34 connected to the rearward end thereof. Rearward plate 34 is preferably parallel to forward plate 26, and positioned a distance from forward plate 26 to retain a concrete form panel 12 (as shown in FIG. 1) therebetween. A second strap 36 projects perpendicularly from rearward surface 28b of forward plate 28, and has a rearward plate 38 affixed to the rearward end thereof parallel to forward plate 28. Rearward plate 38 is spaced a distance from forward plate 28 to receive a form panel 14 (as shown in FIG. 1) therebetween. Straps 32 and 36 are preferably formed with a rectangular cross-section having a vertical longitudinal axis, to permit the upper half of straps 32 and 36 to contact an upper pair of form panels, and a lower half of straps 32 and 36 to contact a lower pair of form panels, when inner tie 20 is mounted between pairs of vertically stacked panels.

A central strap 40 extends rearwardly from common vertical edge 30 of forward plates 26 and 28, and is connected at a rearward end to a common edge 42 connecting rearward plates 34 and 38. Rearward common edge 42 and central strap 40 serve to maintain the first pair of parallel plates 26 and 34 in a particular angular orientation relative to a second pair of parallel plates 28 and 38. As shown in FIG. 1, the first pair of plates 26 and 34, retain form panel 12 in position, while the second pair of plates 28 and 38, retain form panel 14 in position relative to form panel 12.

Form panels 12 and 14 are maintained in their angular relationship by initially cutting a pair of slots 44 and 46 in the upper edges of form panels 12 and 14, respectively, to receive straps 32 and 36 respectively. Once straps 32 and 36 are inserted within the respective slots 44 and 46, the first pair of plates 26 and 34 maintain form panel 12 and the second pair of plates 28 and 38 maintain form panel 14, in a particular angular relationship with one another. As shown in FIG. 1, the most common angular relationship is a 90° angle.

Referring once again to FIG. 3, inner tie 20 is assisted in maintaining its structural shape by the provision of a "T" shaped rib 48 on the rearward face 34b of rearward plate 34, and a second "T" shaped rib 50 on the rearward surface 38b of plate 38. First rib 48 includes a horizontal web 48a mounted continuously along the length of plate 34 and generally centered between the upper and lower edges of plate 34. A vertical flange 48b is affixed to the outward edge of web 48a to form "T" shaped rib 48, and extends along the entire length of web 48a, parallel to plate 34. Similarly, rib 50 includes a horizontal web 50a and a vertical flange 50b, the web perpendicular and affixed to plate 38 and flange 50b parallel to plate 38. Ribs 48 and 50 connect at a common joint 52. A plurality of apertures 54 are formed in rib webs 48a and 50a respectively to receive an end of a connector rod 24, as described in more detail hereinbelow.

Referring once again to FIG. 1, it can be seen that inner tie 20 is preferably positioned between panels 12 and 14 such that ribs 48 and 50 are located between the pairs of panels 12 and 18 and 14 and 16, where concrete will be located upon pouring of the wall. Thus, ribs 48 and 50 will not project outwardly from panels 12 and 14 into the "clean" space of the room formed by the concrete walls.

Figure 2:
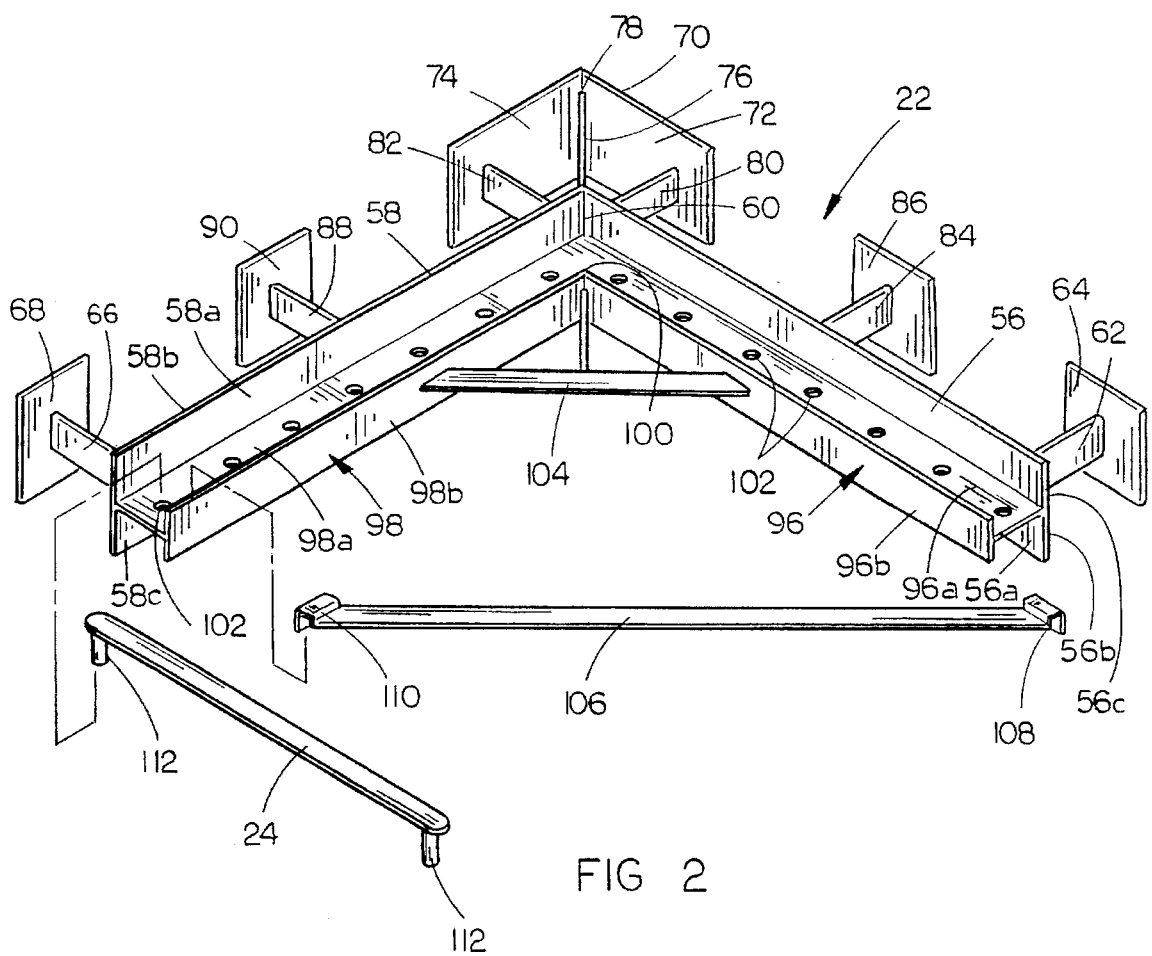
FIG. 2 is an enlarged perspective view of an outer joint tie.

Referring now to FIG. 2, outer tie 22 includes a pair of elongated vertically oriented plates 56 and 58 connected along a common vertical edge 60 at an angle relative to one another. Plates 56 and 58 include forward surfaces 56a and 58a respectively, and rearward surfaces 56b and 58b respectively. A first strap 62 projects perpendicularly rearwardly from rearward surface 56b of plate 56, and proximal a first end 56c of plate 56. A generally planar paddle 64 is affixed to the rearward end of strap 62 and oriented parallel to plate 56 and positioned a distance from plate 56 to retain concrete form panel 18 (as shown in FIG. 1) therebetween. A similar strap 66 projects perpendicularly from rearward surface 58b of plate 58 proximal the projecting end 58c, with a second paddle 68 affixed to the rearward end thereof parallel to plate 58. Second paddle 68 is spaced a distance from plate 58 to receive a form panel 16 (as shown in FIG. 1) therebetween. Straps 62 and 66 are preferably formed with a rectangular cross-section having a vertical longitudinal axis. This permits the upper half of straps 62 and 66 to contact an upper pair of panels, and the lower half of straps 62 and 66 to contact a lower pair of panels when outer tie 22 is mounted between vertically stacked panels. A corner paddle 70 has one leg 72 co-planar with paddle 64, a second leg 74 co-planar with second paddle 68. Corner paddle 70 is mounted rearwardly of common vertical edge 60, with at least a central strap 76 extending from common edge 60 to a common edge 78 connecting legs 72 and 74 of corner paddle 70. A pair of straps 80 and 82 project from the rearward surfaces of plates 56 and 58 to legs 72 and 74 of corner paddle 70. Strap 80 is preferably parallel to strap 62, while strap 82 is parallel to strap 66. Corner paddle 70 is spaced from plates 56 and 58 so as to retain form panels 18 and 16 therebetween, as shown in FIG. 1. For additional support, an intermediate strap 84, parallel to and spaced between straps 62 and 80, extends rearwardly from plate 56, and has an intermediate paddle 86 affixed to the rearward end thereof. Intermediate paddle 86 is co-planar with panels 64 and corner paddle leg 72. A second intermediate strap 88 is located centrally between straps 66 and 82 on the rearward surface of plate 58, with an intermediate paddle 90 affixed to the rearward end thereof. Intermediate paddle 90 is co-planar with paddle 68 and corner paddle leg 74.

As shown in FIG. 1, slots 92a, b and c are cut in the top edge of form panel 18 to receive straps 62, 84 and 80 respectively, with paddles 64, 86 and 70 located to retain form panel 18 in position against plate 56. Similarly, slots 94a, b and c are formed in the upper edge of form panel 16 to receive straps 66, 88 and 82 respectively and thereby position paddles 68, 90 and 70 to retain form panel 16 in position against plate 58.

Referring again to FIG. 2, a pair of "T" shaped ribs 96 and 98 are mounted to the forward faces of plates 56 and 58 respectively, and extend along the lengths thereof so as to interconnect at a joint 100. Rib 96 includes a horizontal web 96a and vertical flange 96b, flange 96b oriented parallel to plate 56 and web 96a located centrally between the upper and lower edges of plate 56 and flange 96b. Similarly, rib 98 includes a horizontal web 98a and a vertical flange 98b, the web perpendicular to plate 58 and centered between the upper and lower edges thereof. A plurality of apertures 102 located through webs 96a and 98a receive one end of connector rods 24 in a manner described in more detail hereinbelow.

Ribs 96 and 98 are located on the forward faces of plates 56 and 58 such that use of outer tie 22 to retain form panel 16 and 18 will locate the ribs between the pairs of form panels 14 and 16 and 12 and 18, where concrete will be poured to form the walls. Thus, ribs 96 and 98 will be located within the wall which is poured, rather than projecting outwardly from the form panels 16 and 18. Because of the strength added by ribs 96 and 98, outer tie 22 may be utilized independently of inner tie 20, to maintain a pair of form panels 16 and 18 at a particular angular orientation relative to one another.

Referring again to FIG. 2, a pair of cross-members 104 and 106 are provided which connect rib flanges 96b and 98b, to maintain them in a fixed relationship and thereby hold outer tie 22 at a fixed angle. Rib 104 is preferably permanently affixed between rib flanges 96b and 98b generally proximal the joint 100. However, cross-member 106 is preferably detachably mounted to flanges 96b and 98b, with retainer clips 108 and 110 at opposing ends of cross-member 106 for gripping the respective flanges 96b and 98b. Thus, the additional strength of detachable cross-member 106 may be added as desired, and may be located by providing a different length cross-member 106.

In the preferred embodiment of the invention, inner tie 20 and outer tie 22 are interconnected by connector rods 24 to form a corner joint tie 10 retaining a pair of form panels 12 and 18 in fixed relationship to a second pair of form panels 14 and 16. Connector rods 24 include depending pins 112 at opposing ends thereof which may be selectively journaled through apertures 54 in inner tie rib webs 48a and 50a, and apertures 102 on outer tie rib webs 96a and 98a. Once interconnected, the structural integrity of the overall corner joint tie is enhanced, yet permits flexibility in the distance between each pair of panels 12 and 18 and 14 and 16, for a various width walls.

Whereas the invention has been shown and described in connection with the preferred embodiments thereof, many modifications, substitutions and additions may be made which are within the intended broad scope of the appended claims.

I claim:

1. A tie for interlocking the ends of form panels, comprising an inner tie portion, including:

first and second forward plates connected along a common vertical edge and having forward and rearward surfaces;

said first and second plates oriented at an angle of less than 180° with respect to one another;

a first strap extending rearwardly from the rearward surface of the first plate;

a first rearward plate mounted on a rearward end of said strap and oriented generally parallel to the first forward plate;

a second strap extending rearwardly from the rearward surface of the second forward plate;

a second rearward plate mounted on a rearward end of said second strap and oriented parallel to the second forward plate;

said first and second rearward plates connected together at the same angle as the first and second forward plates and having a respective length extending horizontally;

a first rib affixed along the entire length of a rearward face of the first rearward plate to strengthen the first rearward plate against flexion along its length; and a second rib affixed along the entire length of a rearward face of the second rearward plate to strengthen the second rearward plate against lengthwise flexion, wherein each said rib is generally "T" shaped, with a web affixed generally perpendicularly along the rearward face of each respective rearward plate and a flange affixed along each web generally parallel to the respective rearward plate.

2. The tie of claim 1, wherein said first and second ribs are connected together at one end with the webs co-planar.

3. The tie of claim 1, further comprising a central strap extending from the connection of the forward first and second plates to the connection of the rearward first and second plates.

4. The tie of claim 1, further comprising an outer tie portion connected to said inner tie portion first and second ribs and spaced rearwardly from the first and second rearward plates of the inner tie portion.

5. The tie of claim 4, wherein said outer tie portion includes:

first and second plates connected along a common first vertical edge and having forward and rearward surfaces, said first and second plates of the outer tie portion oriented at an angle of less than 180° with respect to one another and having a respective length extending horizontally;

a first strap extending rearwardly from the rearward surface of the first plate of the outer tie portion, proximal a second vertical edge of the first plate of the outer tie portion;

a first generally planar paddle mounted on a rearward end of said first strap of the outer tie portion and oriented generally parallel to the first plate of the outer tie portion;

a second strap extending rearwardly from the rearward surface of the second plate of the outer tie portion, proximal a second vertical edge of the second plate of the outer tie portion;

a second generally planar paddle mounted on a rearward end of the second strap of the outer tie portion and oriented generally parallel to the second plate of the outer tie portion; and a corner paddle mounted on said first and second plates of the outer tie portion rearwardly of the common first vertical edge, said corner paddle having a first planar leg co-planar with the first paddle, and a second planar leg co-planar with the second paddle.

6. The tie of claim 5, wherein said outer tie portion further comprises:

a first rib affixed along the length of the forward surface of the first plate of the outer tie portion to strengthen the first plate of the outer tie portion against lengthwise flexion; and a second rib affixed along the length of the forward surface of the second plate of the outer tie portion to strengthen the second plate of the outer tie portion against lengthwise flexion.

7. The tie of claim 6, wherein each said outer tie portion rib is generally "T" shaped, with a web affixed generally perpendicularly along the forward surface of each respective plate of the outer tie portion and a flange affixed along each web generally parallel to each respective plate of the outer tie portion.

8. The tie of claim 7, wherein said outer tie portion ribs are connected together at one end with the webs co-planar.

9. The tie of claim 6, further comprising a cross-member connected between the outer tie portion ribs to retain the first and second plates of the outer tie portion in fixed angular relationship.

10. The tie of claim 1, further comprising an outer tie portion connected to said inner tie portion first and second ribs and spaced rearwardly from the first and second rearward plates of the inner tie portion.

11. The tie of claim 10, wherein said outer tie portion includes:

first and second plates connected along a common first vertical edge and having forward and rearward surfaces, said first and second plates of the outer tie portion oriented at an angle of less than 180° with respect to one another and having a respective length extending horizontally;

a first strap extending rearwardly from the rearward surface of the first plate of the outer tie portion, proximal a second vertical edge of the first plate of the outer tie portion;

a first generally planar paddle mounted on a rearward end of said first strap of the outer tie portion and oriented generally parallel to the first plate of the outer tie portion;

a second strap extending rearwardly from the rearward surface of the second plate of the outer tie portion, proximal a second vertical edge of the second plate of the outer tie portion;

a second generally planar paddle mounted on a rearward end of the second strap of the outer tie portion and oriented generally parallel to the second plate of the outer tie portion; and a corner paddle mounted on said first and second plates of the outer tie portion rearwardly of the common first vertical edge, said corner paddle having a first planar leg co-planar with the first paddle, and a second planar leg co-planar with the second paddle.

12. The tie of claim 11, wherein said outer tie portion further comprises:

a first rib affixed along the length of the forward surface of the first plate of the outer tie portion to strengthen the first plate of the outer tie portion against lengthwise flexion; and a second rib affixed along the length of the forward surface of the second plate of the outer tie portion to strengthen the second plate of the outer tie portion against lengthwise flexion.

13. The tie of claim 12, wherein each said outer tie portion rib is generally "T" shaped, with a web affixed generally perpendicularly along the forward surface of each respective plate of the outer tie portion and a flange affixed along each web of the outer tie portion generally parallel to each respective plate of the outer tie portion.

14. The tie of claim 13, wherein:

said inner tie portion rib webs have a plurality of spaced-apart apertures formed therethrough;

said outer tie portion rib webs have a plurality of spaced-apart apertures formed therethrough;

and the tie further includes a first connector rod having a forward end removably connected to one of said apertures formed through said inner tie portion first rib web and a rearward end removably connected to one of said apertures formed through said outer tie portion first rib web; and a second connected rod having a forward end removably connected to one of said apertures formed through said inner tie portion second rib web and a rearward end removably connected to one of said apertures formed through said outer tie portion second rib web.

15. A kit for interlocking the ends of a first pair of form panels and connecting them to a second pair of interlocked form panel ends, comprising:

a first tie, including:

first and second forward plates connected along a common vertical edge and having forward and rearward surfaces;

said first and second plates oriented at an angle of less than 180° with respect to one another;

a first strap extending rearwardly from the rearward surface of the first plate;

a first rearward plate mounted on a rearward end of said strap and oriented generally parallel to the first forward plate;

a second strap extending rearwardly from the rearward surface of the second forward plate;

a second rearward plate mounted on a rearward end of said second strap and oriented parallel to the second forward plate;

said first and second rearward plates connected together at the same angle as the first and second forward plates and having a respective length extending horizontally;

a first rib affixed along the length of a rearward surface of the first rearward plate to strengthen the first rearward plate against flexion along its length; and a second rib affixed along the length of a rearward surface of the second rearward plate to strengthen the second rearward plate against lengthwise flexion;

a second tie, including:

first and second plates connected along a common first vertical edge and having forward and rearward surfaces, said first and second plates of the second tie oriented at an angle of less than 180° with respect to one another and having a respective length extending horizontally;

a first strap extending rearwardly from the rearward surface of the first plate of the second tie, proximal a second vertical edge of the first plate of the second tie;

a first generally planar paddle mounted on a rearward end of said first strap of the second tie and oriented generally parallel to the first plate of the second tie;

a second strap extending rearwardly from the rearward surface of the second plate of the second tie, proximal a second vertical edge of the second plate of the second tie;

a second generally planar paddle mounted on a rearward end of the second strap of the second tie and oriented generally parallel to the second plate of the second tie;

a corner paddle mounted on said first and second plates of the second tie rearwardly of the common first vertical edge, said corner paddle having a first planar leg co-planar with the first paddle, and a second planar leg co-planar with the second paddle;

a first rib affixed along the length of the forward surface of the first plate of the second tie to strengthen the first plate of the second tie against lengthwise flexion;

a second rib affixed along the length of the forward surface of the second plate of the second tie to strengthen the second plate of the second tie against lengthwise flexion; and a connector rod for removably connecting one rib of the first tie to one rib of the second tie.

* * * * *